United States Patent [19]
Rutgerson et al.

[11] 3,979,957
[45] Sept. 14, 1976

[54] FLOW METER

[75] Inventors: Robert J. Rutgerson, Hopewell Junction; Malcom J. Mills, Wappingers Falls, both of N.Y.

[73] Assignee: Foss America, Inc., Fishkill, N.Y.

[22] Filed: Feb. 12, 1975

[21] Appl. No.: 549,104

[52] U.S. Cl. ............................................. 73/231 R
[51] Int. Cl.² ........................................ G01F 1/115
[58] Field of Search ..................... 73/229, 231 R

[56] References Cited
UNITED STATES PATENTS

| | | | |
|---|---|---|---|
| 3,433,071 | 3/1969 | Homrig | 73/231 R |
| 3,610,039 | 10/1971 | Althouse et al. | 73/231 R |

*Primary Examiner*—Richard E. Aegerter
*Assistant Examiner*—Frederick R. Schmidt
*Attorney, Agent, or Firm*—Wolder & Gross

[57] ABSTRACT

A turbine-type flow meter is described as a construction enabling easy access to all parts for cleaning, servicing and replacement. Specifically, a three piece construction is presented including end caps housing vanes and a central main body for housing a metering rotor. The end cap construction provides the bearings for the rotor and the necessity for flow straighteners is eliminated by pre-selecting a sufficient distance between the rotor and vanes. Flow is measured by electrically counting the rotations of the rotor and means are provided both for sensing gaseous substances and to enable bi-directional flow.

5 Claims, 5 Drawing Figures

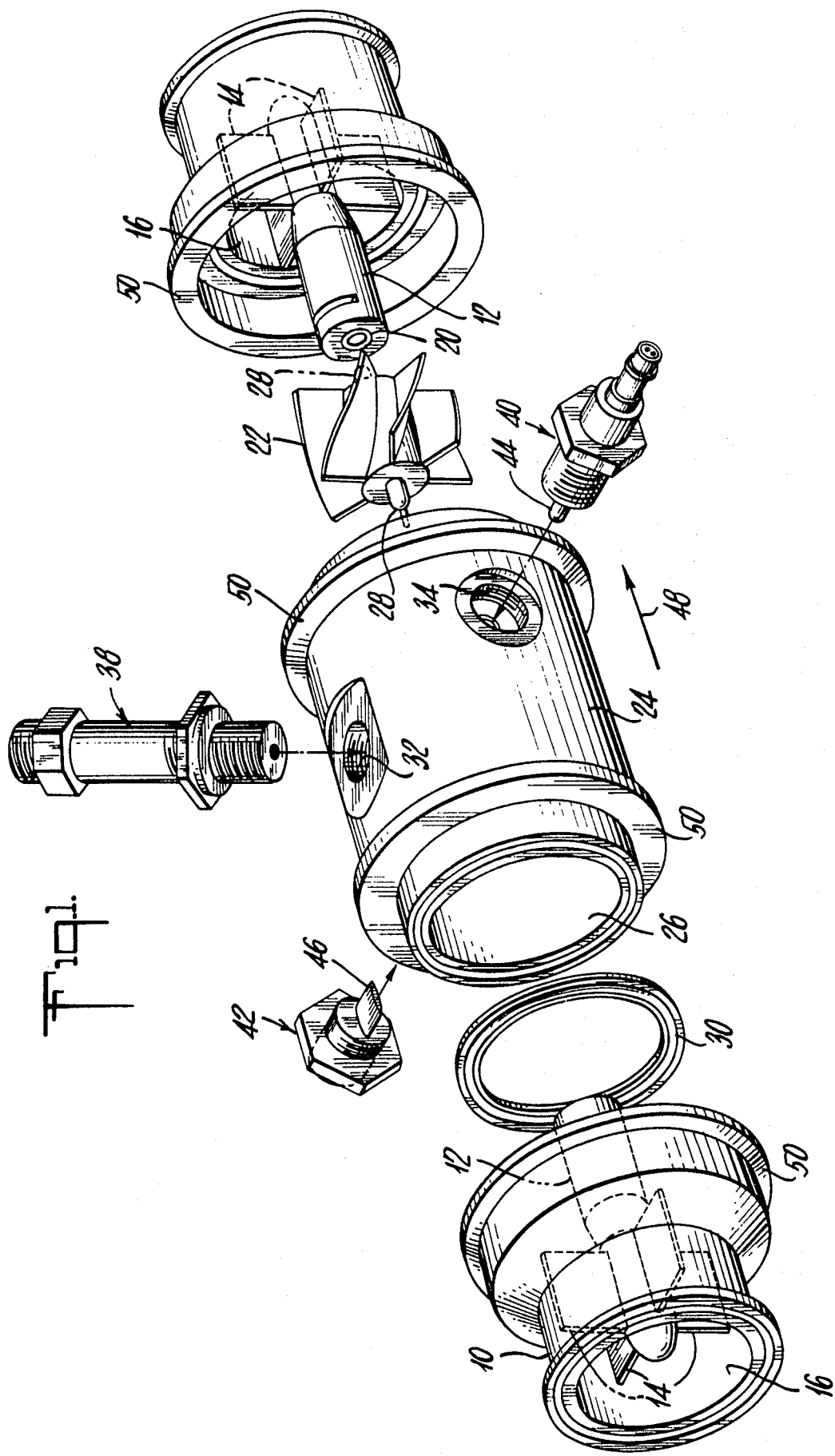

FLOW METER

This invention relates primarily to measuring devices and more particularly to flow measuring device of the turbine-type, particularly useful in applications requiring sanitary and accessible construction.

Presently used flow measuring devices are basically of a one-piece construction whereby a set of vanes straddle a measuring rotor and are clipped into place such as by internal snap rings held in position within the unitary body of the meter. The snap rings engage recesses machined into the body. A separate flow straightener is coupled with the main body of the meter so that the liquid being measured enters the main body in a predictable flow pattern.

For sanitary applications, the presently used one-piece construction with coupled flow straightener is unsatisfactory because of the tendency of contamination to occur where the flow straightener is coupled to the main body and where the internal snap rings holding the vanes engage recesses machined in the main body. Furthermore, the one-piece construction provides a problem of accessibility to the bearings, vanes and rotor for the purposes of cleaning and replacement. Also, such presently used one-piece constructions with attached flow straightener enable uni-directional use only.

Accordingly, it is an object of the present invention to provide a construction for a flow meter of the turbine-type which enables easy access to parts for cleaning, servicing and replacement.

A further and more specific object of the present invention is to provide a multi-piece device to enable easy access to all parts thereof.

A still further object is to eliminate the need for a flow straightener in a flow metering device and to mount the vanes for the meter in such a way as to enable cleaning and servicing in sanitary applications.

Another object of the present invention is to provide a bi-directional flow capability for a flow meter.

These and other objects of the present invention are provided in a flow meter construction of the turbine-type which includes three general parts for enabling easy access for cleaning, servicing and replacement. By way of background, a flow meter of the turbine-type operates with a rotor of magnetic material spinning in response to the flow therethrough of a liquid. A magnetic field is created in the area of the rotor so that as the rotor spins it passes through the field and thereby generates a pulse which can be counted and which relates to the flow of liquid passing the rotor. The flow meter of the present invention includes identical end caps straddling a main body, with the rotor being supported by the end caps for rotation within the main body. Vanes are welded in the end caps at a sufficient distance from the rotor so that flow straightening is accomplished prior to the liquid reaching the rotor. External clamps couple the end caps to the main body and bearing support assemblies are located centrally of the vanes for providing thrust and carrier bearings for the rotor turbine shafts extending axially of the rotor.

The main body defines an outer cylindrical surface centrally through which extends a magnetic impulse counter probe for sensing the rotations of the rotor as the fluid passes therethrough. Also extending through the main body, either forward or backward of the rotor in terms of flow, is an air probe, which senses the conductivity of the fluid passing through the device in order to enable or impede the magnetic impulse counter probe circuit, so that fluid is distinguishable from gas in the measuring process.

A trim vane is inserted through the main body outer surface to create directional turbulence onto the rotor and thereby enable bi-directional calibration of the device.

The above brief description, as well as further objects features and advantages of the present invention, will be more fully appreciated by reference to the following detailed description of a presently preferred, but nonetheless illustrative embodiment in accordance with the invention, when taken in conjunction with the accompanying drawings, wherein:

FIG. 1 is an isometric, disassembled view of a flow meter according to the present invention, showing particularly the arrangement of parts thereof and a construction enabling easy access to parts for cleaning, repair and/or replacement thereof and further illustrating the bi-directional flow capability of the device;

FIG. 2 is a side assembly view, shown partly in section and showing particularly the magnetic impulse counter probe;

FIG. 3 is a back, partly sectional view of the device of FIG. 2 taken along the line 3—3 thereof and showing particularly the air probe and the external clamp holding the end cap to the main body;

FIG. 4 is a back, partly sectional view taken along the line 4—4 of FIG. 2 and showing particularly the trim vane of the device; and FIG. 5 is a side sectional view taken along the line 5—5 of FIG. 4 and showing particularly the trim vane blade shape and construction.

Referring to the drawings, and in particular FIG. 1, a flow meter construction is shown in disassembled view as including end caps 10 of generally cylindrical shape and supporting axially thereof bearing support assemblies 12. Bearing support assemblies 12 are mounted by means of vanes 14 projecting therefrom and welded on the internal surface 16 defined by the end caps. The internally projecting ends of bearing support assemblies 12 mount thrust bearings 18 (FIG. 2) and carrier bearings 20 for supporting rotor 22 as will hereinafter be described.

Main body 24 of the flow meter is also generally of a cylindrical shape and defines there within a precisely cylindrical surface 26. Rotor 22 is positioned centrally and axially of main body 24 with turbine shafts 28 projectng outwardly and axially thereof for mounting within the bearing supports 18, 20 previously described. Sanitary seals 30 effectively seal the mating of main body 24 to end caps 10 so that a continuous, internal cylindrical surface is presented to the material flowing through the device.

Vanes 14 are positioned with respect to the leading edges of the rotor 22 so that there is a distance therebetween of at least one-quarter the internal diameter of the device in order to eliminate the need for flow straighteners, whose function is instead performed by four or more vanes 14.

Main body 24 defines openings 32, 34, 36 (FIG. 4) therethrough to enable mounting, respectively of magnetic impulse counter probe 38, air probe 40 and trim vane 42. Specifically, magnetic impulse counter probe generally designated 38 mounts a magnetic probe 39 and circuit 41 (FIG. 2) whose function it is to magnetically sense the rotations of rotor 22 and to cause a electrical output proportional to such rotations at connectors 43.

The air probe, generally designated 40, includes projectng probe device 44 which actually inserts through the side wall of main body 24 and into the flow path of the fluid being measured. Since it is well known that liquids always include salts making conductivity higher, if it is desired to measure liquids only, air probe 40 senses conductivity and by electrical coupling to magnetic impulse counter probe 38, controls whether or not a measurement is made. For instance, if air only is flowing through the device, air probe 40 will sense the lower conductivity and electrically prevent a measurement by means of an output from magnetic impulse counter probe 38. As a further example, if the device of the present invention were used to measure the amount of tomato juice being processed, air probe 40 would prevent the continuation of counting by magnetic impulse counter probe 38 after the completion of flow by the processed tomato juice when only air would be going through the device.

The trim vane, generally designated 42, is positioned on the opposite side of the rotor to the air probe 40 if fitted. The trim vane is adjustable to create directional turbulence to increase or decrease the rotor speed and to give identical rate of rotation per unit volume flow, as with the trip vane on the downstream side. Trim vane blade 46 of trim vane 42 actually inserts to the path of flow within main body 24 and is adjustable by trial and error to match the turbulence caused by air probe 40 so that the device may be used bi-directionally with either end cap as the input structure for the liquid being measured. For instance, if air probe 40 is positioned after rotor 22 when liquid is flowing in direction 48, there will be no turbulence imparted to the liquid. However, if direction 48 is reversed for the flow, there will be such a turbulence. In order to use the device bi-directionally, if the direction of flow is opposite to direction 48 when magnetic impulse counter probe 38 is calibrated, bi-directional flow will only be enabled if an equal and opposite turbulence is caused when the liquid flows in direction 48. Accordingly, trim vane 42 with trim vane blade 46 projecting into the path of flow is used to create the same turbulence when flow is in direction 48 as was present when calibration took place with flow in a direction opposite to direction 48 as caused by projecting probe device 44. In other words, assume a flow direction opposite to that designated by arrow 48. With air probe 40 in position, 30,000 pulses is the output from magnetic impulse counter probe 38 for 100 gallons of liquid during the calibration procedure. Flow is then reversed to direction 48 and the angle of trim vane blade 46 is adjusted until magnetic impulse counter probe 38 puts out 30,000 pulses for 100 gallons (300 pulses per gallon). After such a calibration procedure, flow is enabled in either direction with the same turbulence effect and attendant accurate measurement in either case.

Referring to the other drawings, the present invention construction is shown assembled with sanitary seals 30 in place. It should be particularly noted that the internal flow path is defined by a continuous cylindrical surface 16, 26. The main body 24 and end caps 10 are formed of non-magnetic stainless steel so as not to interfere with the function of magnetic impulse counter probe 38. The coupling of main body 24 to end caps 10 produces protrusions 50 on the outside surface of the device, over which clamping assemblies 52 conform in order to seal the mating of main body 24 to end caps 10, as is shown particularly in FIGS. 2 and 3.

Clamping assemblies 52 include clamp handle 54, clamp bands 56, hinge 58 and link 60, all operable by means well known.

FIGS. 4 and 5 particularly show the calibration adjustment feature of trim vane 42 whereby trim vane blade 46 is angularly adjusted simply by inserting a screw driver or the like to slot 62 defined by trim vane 42.

In order to more clearly describe apparatus according to the present invention, and the features thereof, a sequence of the operations of the device will now be set forth. Firstly, assembly of the device takes place by removably mounting rotor 22 to bearing support assembly 12 on one of the end caps 10. This is accomplished by merely inserting sanitary seal 30 within end cap 10 and turbine shaft 28 into carrier bearing 20. End cap 10, with rotor 22 thus mounted, is inserted to main body 24. The other end cap is then likewise mated when main body 24 and clamps 52 operated to fix the three-piece construction. Magnetic impulse counter probe 38 is threadedly inserted to a position within the wall of main body 24 so that it is centrally positioned between the ends of main body 24 adjacent the rotor position. Air probe 40 is threadedly inserted so that projecting probe device 44 extends to the flow path within the inner wall 26 of main body 24. Trim vane 42 is likewise threadedly inserted so that trim vane blade 46 extends to within the inner wall 26 of main body 24. The device is then coupled to a pipeline or the like through which liquid is caused to flow in a direction opposite to that designated by arrow 48.

Calibration is performed by causing a known quantity of liquid to flow through the device and counting the pulse output of magnetic impulse counter probe 38. The same quantity of liquid is then caused to flow in direction 48 and the angle of trim vane blade 46 is adjusted so that an equal number of pulses per gallon of liquid is counted by means of magnetic impulse counter probe 38.

The device is now ready for flow in either direction with air probe 40 terminating the output of magnetic impulse counter probe 38 whenever air or another gas is sensed.

Cleaning, repair or parts replacement is conveniently enabled by reversing the assembly process and the smooth, continuous internal flow path prevents contamination from building up within the device, for instance, in a liquid food processing use for the device.

Furthermore, the construction presented by this invention eliminates the need for a separate flow straightener and generally contributes to an efficient, maintainable and yet simple device with flexible convenient usage capability.

What is claimed is:

1. A flow meter construction for use in producing an electrical output indicating the amount of flow therein comprising a pair of symmetrically and axially arranged separating end caps each including an end cap shell, an axially aligned bearing support assembly and vanes extending from said assembly to said end cap shell, a main body between said end caps defining therewithin an inner main body surface, said main body being axially aligned with said end caps and said main body surface defining with said end cap shells a continuous, cylindrical flow meter conduit, a magnetic rotor, supported by said assemblies and within said main body, whose rotation is responsive to flow through said flow meter conduit, a magnetic impulse counter probe for creating a magnetic field in the area of said rotor for generating pulses proportional to flow through said flow meter conduit and external clamping means for holding said end caps to said main body, the distance between said vanes and said rotor being greater than one-fourth the diameter of said flow meter conduit.

2. A flow meter construction according to claim 1 wherein said main body further defines first and second openings through said surface, an air probe extending through said first opening into said conduit for controlling the production of said electrical output and a trim vane extending through said second opening on the opposite side axially of said magnetic impulse counter probe from said air probe, attached to said counter probe and arranged to produce directional turbulence within said conduit and to enable bi-directional flow.

3. A flow meter construction according to claim 1 wherein said assembly removably supports said magnetic rotor.

4. A flow meter construction according to claim 1 wherein said end caps and said main body together define outwardly directed protrusions for mating with said external clamping means.

5. A flow meter construction according to claim 1 wherein sanitary seals are between said end caps and said main body.

* * * * *